Feb. 1, 1966 J. L. GRATZMULLER 3,232,131
GEAR BOX CONTROL MECHANISM
Filed May 3, 1963 4 Sheets-Sheet 2

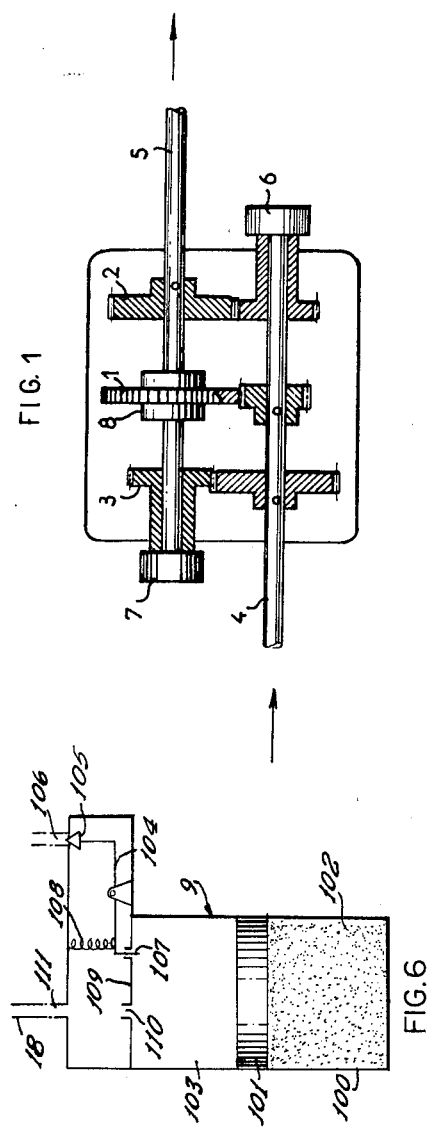

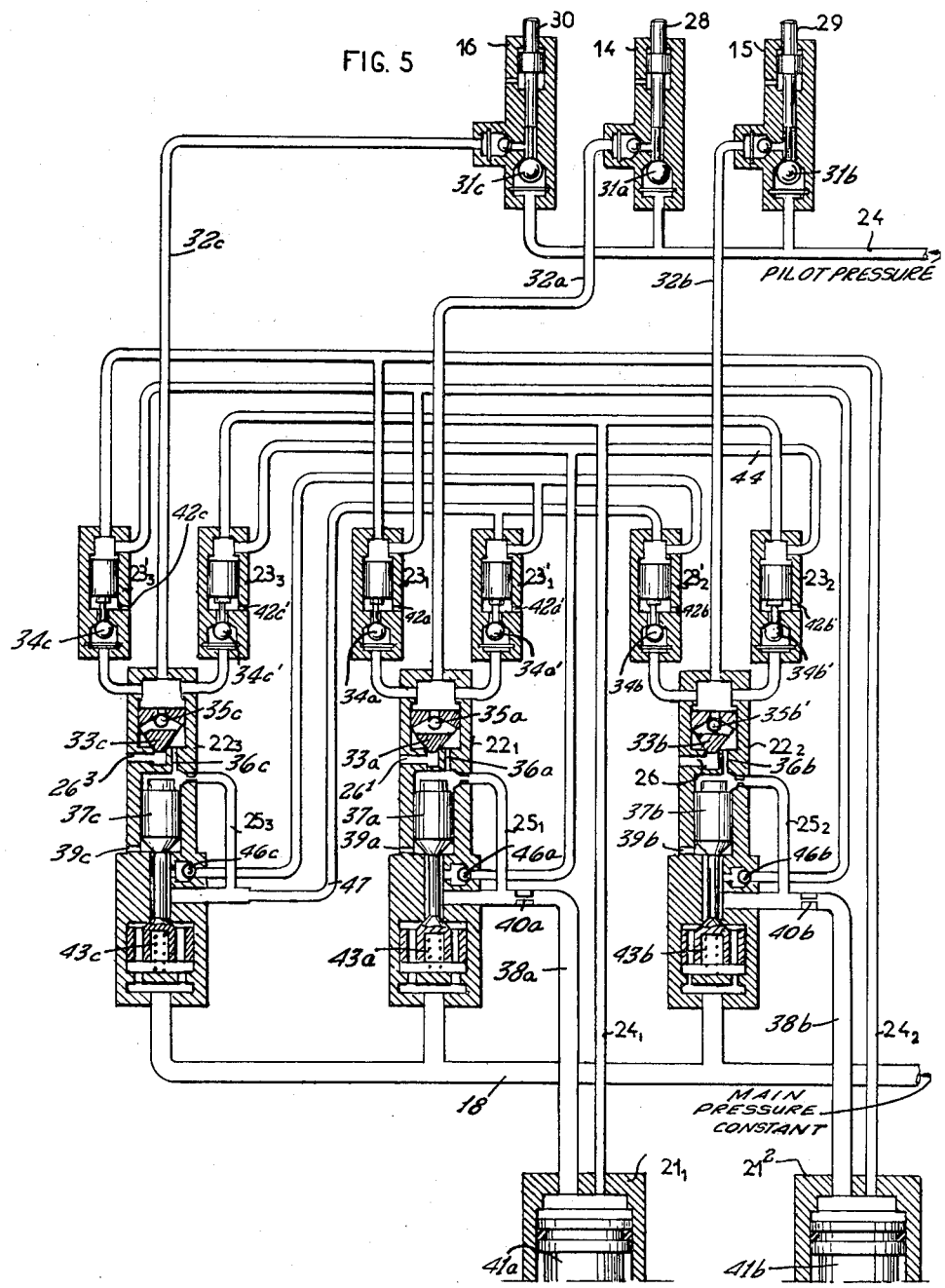

United States Patent Office 3,232,131
Patented Feb. 1, 1966

3,232,131
GEAR BOX CONTROL MECHANISM
Jean Louis Gratzmuller, 66 Blvd. Maurice Barres,
Neuilly-sur-Seine, Seine, France
Filed May 3, 1963, Ser. No. 277,866
Claims priority, application France, May 10, 1962,
897,149
12 Claims. (Cl. 74—364)

The present invention relates to gearboxes in which the change from one gear ratio to the other is effected by engaging or disengaging one or more clutches each actuated by a jack, the said change from one ratio to the other being effected solely by the simple operation of the jack or jacks and not requiring, as for numerous conventional gearboxes, the completion of a complete cycle of operations such as: declutching the engine, separating two meshing pinions, synchronising another pair of pinions, bringing these pinions into mesh and engaging the engine.

The invention is particularly concerned with gearboxes in which clutches permit one or other pinion to be made fast with or disconnected from its shaft for obtaining the desired change in ratio, the said clutches being engaged when their operating means or control jacks which may be cylinder and piston means are connected to a source of fluid under pressure and the clutches being each disengaged when its jack is no longer subjected to pressure.

More specifically, this invention relates to a hydraulic control system for transmission including at least one change-speed gear mechanism having a plurality of pairwise intermeshing toothed wheels, one wheel of one of said pairs being connected to the input shaft and one wheel of another pair being connectable to the output shaft of the gear mechanism by means of any suitable mechanical coupling and preferably of any suitable friction clutch.

According to one feature of the invention, the supply of fluid under pressure to the jacks is assured by a hydraulic fluid supply unit comprising at least one hydropneumatic accumulator supplied by a pump. According to this arrangement, an energy reserve in the form of fluid under pressure, preferably oil, is therefore, always available for ensuring the control of the gearbox, and the installation is not dependent on the speed of rotation of the engine driving the oil pump. It is understood that the aforesaid hydraulic energy unit comprises means for regulating the pressure between predetermined limits, for example by a self-regulating pump or pressure gauge and the accumulator is preferably equipped with a self-draining system such as that described in French Patent No. 1,133,047 filed on September 3, 1955 in the name of the same inventor for: "Self-Draining Hydraulic Energy Accumulator," the said system only allowing the application of pressure to the clutches if the reserve of fluid under pressure is sufficient.

In a gearbox control according to the invention, the valves included in the supply circuit of the jacks are chosen to be of the hydraulic self-holding type, that is to say, after having received the signal (for example a hydraulic or electric signal) controlling the opening thereof they then remain in this open position, even after the said signal has terminated, under the action of the pressure obtaining in the jack which they supply. Such hydraulic self-holding valves have been described in French Patent No. 1,098,565 filed on January 15, 1954 in the name of the same inventor. They make it possible for transient signals to be used and for the clutches to remain locked, as with the clutch springs generally used, until another signal is transmitted as a release signal, which controls the draining of the jack and, at the same time, the return of the valve to its initial closed position is effected, since the pressure causing the self-holding effect has disappeared.

It is appreciated that, in a two-speed gearbox, the engagement or the disengagement of a single clutch enables one or other of the gear ratios to be selectively established. However, in the case where several elementary two-speed gearboxes are associated to increase the number of possible ratios or even more so in the case of gearboxes having a vary large number of gear ratios, it is evident that the change over from one predetermined combination to another combination may necessitate the operation of several clutches and that a certain degree of simultaneousness of the operations is necessary to avoid, for example, two or more clutches producing different combinations of the box remaining engaged for an appreciable time, since clearly this would produce a destructive slipping of one or more of the clutches.

The high-speed self-holding valves and also the hydraulic accumulator circuits used according to the invention make it possible for extremely brief response times of the clutch jacks to be obtained, thus ensuring a satisfactory simultaneousness of the operations. It may frequently happen that, in order to change from one gear ratio to another, one of the clutches should be disengaged while another clutch should be engaged. Now it is obvious that if the first clutch is disengaged as soon as the instruction for the draining of the corresponding jack is executed (that is to say, as soon as the pressure being exerted on the clutch plates has disappeared) and that if the second jack starts its action simultaneously due to the rapidity of response of the hydraulic control, the action of this second jack would become effective (that is to say, the plates of the clutch will be locked) only after an approach travel which, although short, will cause a certain delay between the two operations.

This is the reason why, in the preferred embodiment of the invention, the control means has provided thereon a safety and synchhronising device by which the disengagement of one or more clutches (i.e. the release of the draining valve or valves of the jacks of the said clutches) are placed under the control of the pressuring of the jack or jacks controlling the clutch or clutches which are to be engaged.

According to this arrangement, the signal controlling the disengagement of one clutch can be produced only when the order for the engagement of another clutch reaches its execution phase, i.e. when the resistance to the locking of the clutch plates causes the pressure in the corresponding jack to rise, the said pressure generating the aforesaid signal.

In other words, it can be said that this characteristic of the invention consists in that the release members controlling the disengagement of the clutches are at each instant under the control of the combination set up in the box at this instant by the set of different clutches.

A control system according to the invention may easily be arranged so as to be preselective, that is to say, it is possible to prepare beforehand the lay-out of the hydraulic control system of the jacks and to admit the fluid under pressure into the complete circuit, by operating a general supply valve, only at the moment when it is desired to change gear. It is obvious that the aforesaid lay-out, which can be quite complex for gearboxes having a large number of speeds, may be established easily by means of a normal selector device, for example a cam drum, which ensures the positioning of all the desired valves by a single control means.

The invention will be better understood after reading the detailed description which follows and after examining the accompanying drawings, which illustrate certain embodiments of the invention as non-limitative examples.

In these drawings:

FIG. 1 is a diagrammatic section of a three-speed gearbox, the operation of which can be controlled by a system according to the invention.

FIG. 2 is a gearbox formed by four boxes identical with that of FIG. 1 being arranged in series.

FIG. 5 shows the hydraulic circuit relating to the control of an elementary three-speed gearbox of the type shown in FIG. 1.

FIG. 6 is a diagrammatic showing of an accumulator that may be used in connection with the invention.

Figure 3:
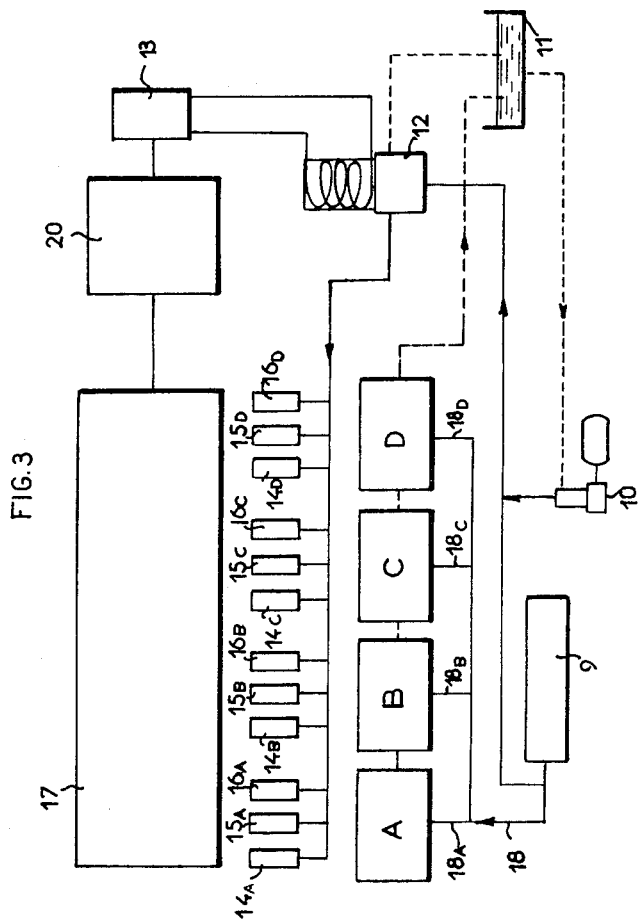
FIG. 3 is an assembly diagram of a control system according to the invention applied to a box having 81 gear ratios, identical to that of FIG. 2.

The gear mechanism comprises an input shaft 4, an output shaft 5, a plurality of drive gears on said input shaft, one of said drive gears being fixed and another one being connectable to the input shaft for rotation therewith, a plurality of driven gears 1, 2, 3 on the output shaft each in constant meshing with said other drive gear being fixed and the driven gear 3 meshing with said one drive gear being connectable to the output shaft for rotation therewith, first clutch means 6 for connecting said connectable drive gear to said input shaft, and second clutch means 7 for connecting said connectable drive gear 3 to the output shaft.

In order to eliminate undue friction between the movable member and the stationary member of each clutch, the hydraulic system preferably includes a source of constant liquid pressure 9 so as to move the axially movable member of each selected clutch preferably against the action of resilient declutching means (not shown) into the fully engaged clutch position and to maintain said member in said fully engaged position thereof by means of a substantially constant liquid pressure.

With such a gearbox, the lowest speed of the output shaft (or small ratio) is obtained when none of the clutches is engaged, the intermediate ratio when only the clutch 6 is engaged and the high ratio is obtained when only the clutch 7 is engaged. In the latter two cases, the pair of pinions 1 are uncoupled from one another because of the free wheel 8, so that with such an arrangement, a three-speed box is provided which is controlled by only two clutches, but it will be understood that the invention would also be applicable to a box comprising an arrangement with a different number of clutches.

FIG. 2 shows the arrangement in series of four elementary boxes identical with that of FIG. 1, this forming a gearbox with 81 different ratios, which are obtained by operating one or other of the 8 clutches 6, 7, 6', 7' . . . etc. The system according to the present invention is of particular interest when used in gearboxes having a large number of ratios for a diesel locomotive, particularly in those which have been described in the French patent filed in the name of the same inventor on November 9, 1961 for: "Improvements in Change-Speed Gears."

It may be recalled that a gearbox with 81 speeds, such as that shown in FIG. 2, makes it possible in accordance with the aforesaid patent to obtain a large range of extreme ratios (for example of the order of 1 to 12) with a spacing in graduated geometric progression approximately from 3 to 3.03, this rendering possible the change from one combination to the immediately adjacent combination practically without any shock and using rudimentary clutches. The rapidity of the engagement or disengagement of the clutches obtained by virtue of a hydraulic control system according to the present invention enables the operations to be carried out practically without any relative slip of the members to be coupled or separated and thus without any interruption of load.

The control system and its hydraulic circuit are diagrammatically shown in FIG. 3, in connection with a change-speed gear comprising four elementary boxes each of three speeds, but it can be assumed that each box comprises three clutches in order to simplify the explanation.

The source of hydraulic energy is formed by an oleopneumatic accumulator which is recharged by an electric pump 10 (self-regulating or with pressure gauge) which takes the oil from a drain tank 11. A general supply electromagnetic valve 12, controlled manually or automatically by a control member 13, permits the oil under pressure to be admitted to all the control valves (which will be hereinafter referred to by the term "controllers") $14_A$, $15_A$, $16_A$, $14_B$, $15_B$, . . . $16_D$, the function of which is to send to each clutch the signal controlling the operation thereof. All the controllers 14–15–16 are brought by a cam drum 17 into the position corresponding to the selected speed combination, that is to say, each cam acts for example on a plunger which opens or closes each of the valves $14_A$, $15_A$ . . . .

In each of the elementary boxes A–B–C–D, the clutch jacks are supplied, when their controller is in the required position, by a pipe conduit 18, which is connected to the accumulator 9 and which is split up into four conduits $18_A$, $18_B$, $18_C$, $18_D$, towards each of the gearbox controls. The drum 17 serves the purpose of a controller and can be actuated automatically by a system 20 which is usual on locomotives and which preselects the desired speed combination, the change in ratio being effectively achieved only when the general supply electromagnetic valve 12 is temporarily energised.

The control circuits and members of each of the boxes A, B, C, D are identical, as will be seen from FIG. 3, so that in order to simplify explanation, only one of these circuits will be described in greater detail in the following by reference to FIGS. 4 and 5.

Figure 4:
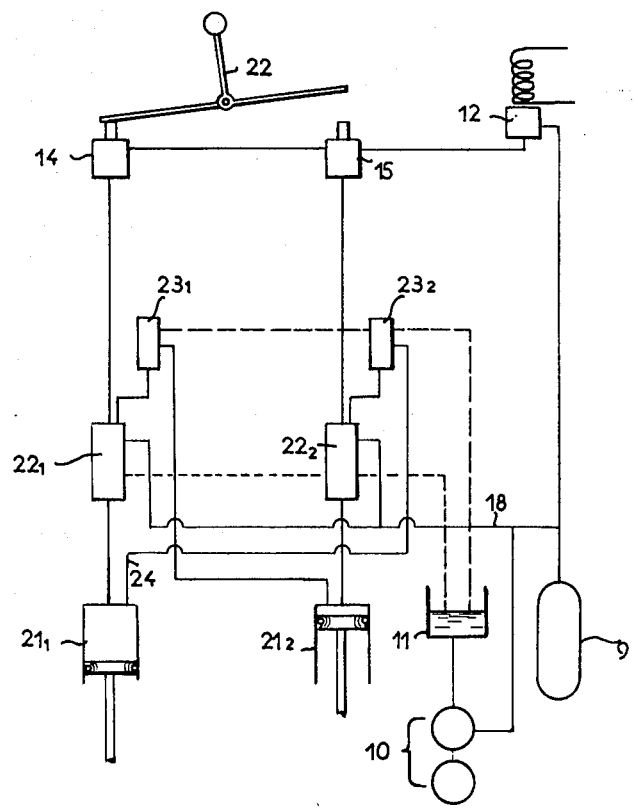
FIG. 4 shows diagrammatically the hydraulic circuit of a control system according to the invention applied to an elementary two-speed gearbox.

The control system shown diagrammatically in FIG. 4 is applied to an elementary two-speed gearbox comprising two clutches, i.e. one of the ratios is obtained when the jack $21_1$ actuating one of the clutches is supplied with oil under pressure while the other jack $21_2$ is being drained, the second ratio being obtained with the reverse situation as regards the ratios. The circuit comprises the same members as that illustrated in FIG. 3, i.e. an oleopneumatic accumulator 9, a pump 10, a tank 11, a general supply valve 12 and only two controllers 14 and 15. A manual control of these controllers is shown diagrammatically in the form of a rocking lever 22 which, in the position shown in FIG. 4, holds the controller valve 14 open while the controller valve 15 is closed.

The diagram of FIG. 4 has particularly for its object to show the very important characteristic of a control according to the invention, which consists in ensuring at least one of the operations with the execution of at least another of the operations or, more specifically, in the case illustrated, of only allowing one clutch to be freed when the other clutch is brought into engagement so that the execution of the operations which must be accomplished simultaneously is synchronised, or else of synchronising only the signals controlling these operations, as is carried out up to the present time.

The controllers 14 and 15 respectively control the main self-holding valves $22_1$–$22_2$, which will be described hereinafter in greater detail. The pressure obtaining in the jack $21_1$ controls a release valve or release member $23_2$, which is connected to the main valve $22_2$, so as to allow the draining of the jack $21_2$ only when the pressure is established in the jack $21_1$. Symmetrically, the main valve $22_1$ is controlled at release by a release member $23_1$ which is under the control of the pressure obtaining in the jack $21_2$.

The draining conduits are indicated in broken lines in FIG. 4 (one in FIG. 3).

The oleopneumatic accumulator of FIGURE 6 comprises a cylinder 100 in which a free piston 101 slides.

In the closed end 102 of the cylinder air is entrapped to form the accumulator cushion. In the other end of the cylinder 103 the liquid of the system exerts pressure on the piston. At the end of the cylinder there is a lever 104 having a valve element 105 at one end that closes a damping passage 106. The other end 107 of the lever is positioned to lie in the path of the piston so that, when the piston 101 strikes the end 107 of the lever it causes the lever to pivot against spring 108, and the damping passage 106 is opened. The piston is, of course, stopped by end 109 of the cylinder through which at least one opening 110 is provided. The opening 111 is connected to the hydraulic system. It will be seen, therefore, that if the pressure of hydraulic fluid 103 falls below the value required to press the piston 101 away from the lever end 107, the valve 105 will lift and the pressure in the hydraulic system will be reduced to zero. This is desirable as a safety measure since insufficient pressure to assure prompt and smooth operation might cause two clutches to be engaged at the same time.

The operation of the control system is as follows: When the box is in the first gear ratio (shown in the figure), the main self-holding valve $22_1$ produces and maintains the communication of the pressure oil conduit 18 with the jack $21_1$, which holds the first clutch engaged. The oil under pressure of the jack communicates through the conduit 24 with the release member $23_2$ (which is a hydraulically controlled valve), which is open, and this causes the draining of the main valve $23_2$ and consequently the jack $21_2$, the clutch of which is thus disengaged. The result is that the release member $23_1$ is not subjected to any pressure, i.e. its valve is closed.

In order to change to the second gear ratio, the lever 22 is rocked, which opens the controller 15 after having closed the controller 14. At the instant when it is desired effectively to change the speed, the general supply valve 12 is temporarily opened, the oil under pressure is admitted to the main valve $22_2$, which it actuates (despite the fact that the release member $23_2$ is open, becaus the discharge of this valve for draining is small, as will be set out later). The main valve $22_2$ being thus actuated produces communication between the jack $21_2$ and the pressure oil conduit 18 and the clutch controlled by the jack $21_2$ carries out its approach movement, without appreciable rise in pressure, so that the release member $23_1$ remains closed, that is to say, the jack $21_1$ is still not in the draining position and its clutch remains engaged. When the plates of the clutch controlled by the jack $21_2$ come into contact, the pressure in this jack is raised and causes the release member $23_1$ to open and this, by means of the main valve $22_1$, places the jack $21_1$ in the draining position, the clutch of which is thus disengaged simultaneously with the engagement of the other clutch. There is thus obtained a perfect synchronism of the operations without interrupting the load and, in addition, a complete safety arrangement is available which prevents two clutches remaining together in mesh, since the engagement of one controls the release of the other.

Furthermore, it is seen that the closing of the supply valve 12 may be quite transient, since it is a question of a simple hydraulic signal and since in addition the conduit 12 may be selectively brought into the following position without modifying the state of the control circuit.

FIG. 5 shows in greater detail the control system of an elementary three-speed gearbox corresponding to those shown in FIGS. 1 and 2, that is to say, comprising two clutches and a free wheel. The identical members bear the same references as those which appear in the preceeding figures.

In order to ensure quick clutch operation, the invention provides a flow control valve $22^1$, $22^2$ for each actuator piston $21^1$, $21^2$, such valve being adapted to connect the co-related piston to the liquid pressure source 9 or to the exhaust, one face of the movable valve member communicating with the main pressure line 18 and the other face of the movable valve member communicating with the service line leading to the co-related piston, through a holding conduit 25 whereby the holding pressure built-up at said other face of the movable valve member is released by means of an unloader valve 23 controlled by the pressure produced in another actuator cylinder 21 so that any engaged clutch is permitted to disengage upon actuation of another selected one of said actuator pistons.

It is desirable to not interrupt the drive transmission during change-over. Therefore, one of the clutches shall not be disengaged as long as the other clutch is not fully engaged. This is obtained, according to the invention, by subjecting the unloader valve 23 of the engaged clutch to the liquid pressure built-up in the actuator cylinder 21 of the newly actuated clutch *after* full engagement of the latter so as to permit subsequent disengagement of the previously engaged clutch (preferably under the action of resilient means) almost instantaneously after the newly actuated clutch is in fully engaged position.

According to a modification (see FIG. 1), at least one of the gear mechanism or units may comprise an additional pair of gears and a suitable free-wheel device 8. While the hydraulic control system of FIG. 4 is operable with a gear unit having only two pairs of intermeshing gears (2, and 3), the hydraulic control system disclosed in FIG. 5 is designed to operate with a gear unit comprising three pairs of intermeshing gears 1, 2, 3. With clutches 6 and 7 present, the disengagement of one of the clutches without previous engagement of the other clutch is provided for by an auxiliary flow control valve $22^3$ permitting the release of liquid pressure in any one of the actuator cylinders 21 without previous pressure liquid supply to another actuator cylinder.

As will be apparent from an inspection of the accompanying FIG. 5, each flow control valve $22^1$, $22^2$ comprises a movable main valve means $37a$, $37b$ and a movable pilot valve means $33a$, $33b$. If for instance, the movable valve member $21a$ of controlling valve 14 is opened by means of a push rod 28 so as to conduct pilot pressure from source 24 through supply conduit $32a$ to the pressure face of pilot valve $33a$, the valve members of the unloader valves $23^1$ and $23'^1$ as well as the pilot valve $33a$ will be applied on their respective seats so that the pilot liquid pressure from 24 is prevented from flowing towards the respective exhaust ports $26^1$, $42a$ and $42a'$, but is forced to flow through a check valve $35a$ and duct $36a$ to main valve means $37a$ to move the latter downwardly whereby to interrupt the communication between service lines $38a$ and a further exhaust port $39a$ and connect service line $38a$ with the main supply line 18. There is a restriction $40a$ in service line $38a$ and the liquid pressure built up ahead of this restriction is transmitted to the upper face of the main valve means $37a$ through a branch conduit $25^1$ to hold the main valve means $37a$ in the operative position thereof. The pressure liquid fed from 18 to actuator cylinder $21^1$ will move piston $41a$ toward clutch engaging position. As soon as piston $41a$ attains the fully engaged position (in which the rotational speed of output shaft 5 is increased by the thus engaged clutch 7 as to over-run freewheel mechanism 8), the pressure liquid in cylinder $21^1$ will build-up a pressure transmitted through pipe $24^1$ to the unloader $23^2$ cooperating with the flow control valve $22^2$, and such pressure will be effective to open the movable member $34b'$ of said unloader valve whereby to establish a communication between the pilot pressure (if any) acting on the pilot valve $33b$ and exhaust port $42b'$.

If it is desired to engage clutch 6 (the controlling valve 14 being again closed), it suffices to depress valve member 31b of the controlling valve 15 by means of push rod 29 to deliver pilot liquid pressure from supply line 24 through pipe 32b to pilot valve means 33b, 35b. Since the flow rate of pilot pressure liquid permitted to escape through exhaust port 42b' is considerably smaller than that of the pilot liquid conducted to the pressure face of pilot valve 33b, the pilot liquid pressure will apply the valve members 33b (and 34b, if present) on their respective seats and will flow through check valve 35b and duct 36b to main valve member 37b to move the latter into operative position thereof. The pressure liquid from main supply line 18 is now allowed to move piston 41b in cylinder $21^2$ as soon as piston 41b is at the end of its clutch engaging stroke is transmitted through pipe $24^2$ to the unloader valve $23^1$ cooperating with flow control valve $22^1$ in order to release the pilot pressure acting on valve 33a. Upon release of the pilot pressure, the holding pressure above main valve member 37a will push pilot valve member 33a upwards to then escape through exhaust duct $26^1$. Since the holding pressure thus disappears, the main valve member 37a is shifted into inoperative position by the main liquid pressure in supply line 18 to thereby connect cylinder $21^1$ to the exhaust port 39a. Unloader valve $23^2$ has a pipe connection 44 with flow control valve $22^1$ and such pipe connection has a check valve 46a therein to prevent liquid flow from valve $22^1$ to unloader valve $23^2$. The end of pipe 44 connected to valve $22^1$ is controlled by main valve member 37a in such a manner as to establish a communication between pipe 44 and the exhaust port 39a when main valve member 37a is in the inoperative position thereof so that the movable valve member 34b' of unloader valve $23^2$ will be closed by the pilot pressure in 32b as soon as actuator cylinder $21^1$ is connected to exhaust port 39a, whereafter controlling valve 15 may be closed.

It will now be clear that any actuator piston 41a or 41b is permitted to return into de-clutched position (preferably under the action of not represented spring means) immediately after a not engaged piston 41b or 41a has been moved into its clutch engaging position.

With the just described system, it is possible to operate the clutches 6 and 7 of FIG. 1 alternately as many times as desired by actuating the controlling valves 14 and 15 disclosed in FIGS. 4 and 5 provided, of course, that the free-wheel connection 8 is omitted and that an appropriate drive transmission clutch is interposed between input shaft 4 and the driving motor or engine.

Such drive transmission clutch may, however, be replaced by an auxiliary flow control valve $22^3$ mounted to cooperate with any number of flow control valves, such as $22^1$ and $22^2$ and which functions in substantially the same manner as the valves $22^1$ and $22^2$. But instead to connect the main pressure line 18 with an actuator cylinder 21, valve $22^3$ is provided to connect the main pressure line 18 with an additional unloader valve $23'^2$ for valve $22^2$ by means of a pipe 47 so that, upon actuation of controlling valve 16, the valve means of flow control valves $22^1$ and $22^2$ are caused to return.

Broadly, if the complete system $22^1$, $22^2$, $22^3$ of FIG. 5 is used in conjunction with a gear box having no free-wheel mechanism 8, there is no need to provide a drive transmitting clutch between input shaft 4 and the engine, and when the complete system of FIG. 5 is used in conjunction with a gear box having the free-wheel mechanism 8, the auxiliary valve $22^3$ permits a change-over from any of the clutches 6 and 7 to the gear ratio determined by the free-wheel mechanism 8.

The three controllers 14–15–16 are fed through a conduit 24 leading to the general supply valve 12, not shown. The drum 17 (FIG. 3) acts on the plungers 28–29–30 (FIG. 5) which mechanically control the opening of the controllers.

The main valves $22_1$–$22_2$–$22_3$ are shown with their known self-holding circuit $25_1$–$25_2$–$25_3$ which connects the supply conduits of the jacks to the control cylinders 22 of these valves. Each main valve is associated with two release members 23–23', which are respectively controlled by each of the two other clutch control circuits. The release members comprise a drain orifice 26 which is calibrated in such a way that when a release member is open, the delivery of oil originating from the corresponding controller 14–15–16 is sufficient to open the associated main valve, despite the leakage caused by the opening of this drain orifice.

The circuit of the controller 16 does not control any clutch, since this ratio is obtained by the engagement of the free wheel when the two clutches controlled by the jacks $21_1$ and $21_2$ are released. However, this circuit is connected to two release members $23'_1$–$23'_2$, which are identical with the others and which are supplied by a clutch which can be qualified as imaginary, that is to say, the pressure inlets of these release members are directly formed on the outlet of the main valve $22_3$, which is at the same pressure as that at which would be found a third clutch if the box did not comprise a free wheel.

It is obvious that the invention is not in any way limited to the example which has been described and illustrated and it is capable of numerous variations available to the person skilled in the art, depending on the applications proposed and without thereby departing from the scope of the invention.

I claim:

1. A control arrangement for gear boxes of the kind in which change from one gear ratio to another is effected by engaging and disengaging clutches which arrangement comprises a plurality of clutches, an actuating cylinder for each clutch, a source of cylinder operating fluid and pressure, a fluid accumulator for storing said cylinder operating fluid, a main control valve for each cylinder to control admission of the fluid to the said cylinder, said valve being opened to admit fluid to its associated cylinder and being held open by the pressure of fluid in the said associated cylinder and means for allowing a controlled flow of fluid from the jack for releasing the clutch.

2. A control arrangement for gear boxes of the kind in which change from one gear ratio to another is effected by engaging and disengaging clutches which arrangement comprises a plurality of clutches, a fluid operated piston and cylinder means for each clutch, a source of cylinder and piston operating fluid under pressure; a pressure fluid accumulator for storing said cylinder and piston means operating fluid, a main control valve for each cylinder and piston means controlling admission of the fluid to the said cylinder and piston means, which valve opens to admit fluid to its associated cylinder and piston means and is held open by the pressure of fluid thereto, and a release valve associated with each control valve, said release valves being connected so as to be sensitive to the pressure built up in another of said cylinder and piston means and to operate to allow fluid to drain from its associated cylinder and piston means only when the pressure in said other cylinder and piston means is established.

3. A control arrangement for gear boxes of the kind in which change from one gear to another is effected by engaging and disengaging clutches, comprising a plurality of clutches, a jack for each clutch, a source of fluid under pressure, a pressure fluid accumulator for storing jack operating fluid, a main self holding valve for each jack controlling the admission of fluid to the said jack, said valve opening to admit fluid to its associated jack and being held open by the pressure of fluid therein, a controller valve for each self holding valve which is so connected that its operation hydraulically controls the movement of the said self holding valve to bring said self holding valve to a position wherein it allows fluid to flow to its associated jack, and means for allowing only a controlled flow of fluid from the jack for releasing the clutch.

4. A control arrangement for gear boxes as described in claim 3 of the kind in which change from one gear to another is effected by engaging and disengaging clutches, which arrangement comprises a plurality of clutches a jack for each said clutch, a source of fluid under pressure, a pressure fluid accumulator for storing jack operating fluid and, in which the said controller valves are arranged to be operated on the receipt of a temporary signal.

5. A control arrangement for gear boxes of the kind in which change from one gear to another is effected by engaging and disengaging clutches, which arrangement comprises a jack for each clutch, a pressure fluid accumulator for storing jack operating fluid according to claim 4, also including a fluid control valve common to all the controller valves, the said common valve and said controller valves being operatively connected so that opening of the common valve causes the gear ratio to be changed according to the preselected controller valve position.

6. A control arrangement for gear boxes of the kind in which change from one gear to another is effected by engaging and disengaging clutches, which arrangement comprises a plurality of clutches, a jack for operating each clutch, a source of jack operating fluid under pressure, a pressure fluid accumulator for storing jack operating fluid, a main self holding valve for each jack to control admission of fluid to the said jack, said valve opening to admit fluid to its associated jack and being held open by the pressure of fluid in another jack operating another clutch, a controller valve for each self holding valve which is operatively connected to said self-holding valve so that its operation hydraulically controls the movement of the said self holding valve to bring said self holding valve to a position wherein it allows fluid to flow to its associated jack, and release valves operatively connected to each control valve, said release valves being connected so as to be sensitive to the pressure obtaining the said other jack to operate to allow fluid to drain from its own jack only upon pressure in said other jack being established.

7. A control arrangement for gear boxes as in claim 6 of the kind in which change from one gear to another is effected by engaging and disengaging clutches, conduit means interconnecting said accumulator, valves, and jacks and means to impress a temporary signal on the fluid in said conduit means, the said controller valves being arranged to be operated by the receipt of said temporary signal.

8. A control arrangement for gear boxes of the kind recited in claim 7 in which change from one gear to another is effected by engaging and disengaging clutches, also including a fluid control valve common to all the said controller valves, the said common valve and said controller valves being operatively connected so that opening of the common valve effects the change of gear ratio in accordance with the controller valve position.

9. A control arrangement according to claim 8, in which the said accumulator includes means whereby pressure can be applied to the jacks only when the fluid pressure is above a predetermined value.

10. A control arrangement for gear boxes according to claim 9, including also a cam carrying control member, the cams of which engage the said controller valves to cause operation of said valves.

11. A hydraulic control system for gear transmissions comprising the combination with at least two clutches operable for controlling the speed ratio of the transmission, of a source of liquid under pressure, a plurality of hydraulic actuator cylinders operatively connected each to one of said clutches, and selectively connectable to said source of liquid under pressure to effect the desired changes from one speed ratio to another, a plurality of flow control valves associated each with one of said cylinders, respectively, and each having a body provided with a pilot pressure inlet port connectable to said source of fluid under pressure, a main pressure inlet port communicating with said source of fluid under pressure and a port intermediate said two inlet ports, a service line connecting said intermediate port to the associated actuator cylinder, main liquid pressure responsive valve means movable in said body between an inoperative position, in which a communication is established between said intermediate port and the exhaust, and an operative position in which they establish communication between said intermediate port and said main pressure inlet port, movable pilot valve means arranged in said body in spaced relation with said main valve means and having a pressure face exposed to liquid pressure entering said body through said pilot pressure inlet port, a branch line leading from said service line to the space between said main and pilot valve said pilot valve means being adapted to close said duct means in response to pilot liquid pressure acting on said pressure face while permitting pilot liquid pressure to flow in the direction of said space only so as to move said main valve means from said inoperative means are maintained by the holding pressure built up in said space as said service line communicates with said main pressure inlet port, a pressure line interconnecting each cylinder and its associated flow control valve in such a manner as to communicate with the exhaust when the main valve means are in said inoperative position thereof, an unloader valve cooperating with each flow control valve and having an actuating member operative to establish a communication between the pressure face of the co-related pilot valve means and the exhaust, and a check valve means in each of said pressure lines permitting flow of pressure liquid in the direction of the flow control valve only, the pressure line interconnecting one of the flow control valves and its associated cylinder passing via the valve actuating member of the unloader valve cooperating with the other flow control valve and the pressure line interconnecting said other flow control valve and its associated cylinder passing via the valve actuating member of the unloader valve cooperating with said one flow control valve whereby each unloader valve will initiate the release of the liquid pressure in the co-related cylinder in response to liquid pressure built up in the other cylinder.

12. A hydraulic system according to claim 11, further comprising a second unloader valve for each flow control valve, an auxiliary control valve operative to open all said second unloader valves in response to liquid pressure supplied by said source, and two third unloader valves cooperating with said auxiliary control valve, one of said third unloader valves is responsive to the liquid pressure in one of said cylinders and the other of said third unloader valves being responsive to the liquid pressure in the other cylinder to cause said auxiliary control valve to connect said second unloader valves to the exhaust as soon as liquid pressure is built up in any one of said cylinders.

No references cited.

DON A. WAITE, *Primary Examiner.*